United States Patent Office 3,582,271
Patented June 1, 1971

3,582,271
METHOD FOR MANUFACTURING ALUMINA WHISKERS
Shigekazu Minagawa, Tetuo Gejo, and Tadashi Saito, Tokyo, Japan, assignors to Hitachi, Ltd., Tokyo, Japan
Filed July 11, 1968, Ser. No. 744,004
Claims priority, application Japan, July 14, 1967, 42/45,059
Int. Cl. C01s 7/30
U.S. Cl. 23—142                                    6 Claims

ABSTRACT OF THE DISCLOSURE

Alumina whiskers having a high strength are manufactured in a high yield by passing a hydrogen gas containing water vapor having a partial pressure of not more than $5\times10^{-4}$ atm. and aluminum chloride having a partial pressure of $6\times10^{-6}$ to $2\times10^{-3}$ atm. over aluminum or its alloys heated to 1400 to 1600° C. and conducting reaction of aluminum vapor with water vapor in the presence of aluminum chloride vapor.

Alumina whiskers are useful as a reinforcing material for synthetic resin or metallic material.

BACKGROUID OF THE INVENTION

(1) Field of the invention

This invention relates to a method for manufacturing alumina whiskers, more particularly an improved method for manufacturing alumina whiskers by passing a hydrogen gas containing a very small amount of water vapor over heated aluminum and conducting reaction of aluminum vapor with water vapor.

The whiskers generally have a strength several tens to several hundred times as high as that of the bulk material and have a wide field of applications, for example, in preparation of composites having a high strength by mixing the whiskers into a synthetic resin or metallic material. Particularly, the alumina whiskers have an excellent strength at an elevated temperature and a low specific gravity and are therefore most useful as a reinforcing material for the composites.

(2) Description of the prior art

A method based on passing a hydrogen gas containing a very small amount of water vapor over aluminum or various aluminum alloys heated to about 1,500° C. and conducting reaction of aluminum vapor emitted from the heated aluminum or its alloys with water vapor is well known as a process for manufacturing alumina whiskers.

Further, several improved methods based on adding SiO vapor to said reactant or providing pieces of alumina porcelain close to the heated aluminum have been proposed. However, in these methods only about 1% by weight of alumina whiskers based on the fed aluminum can be obtained. In other words, an art of manufacturing the alumina whiskers in a high yield has not been established yet, and thus the alumina whiskers have been very expensive material and have been difficult to commercially produce for its economical and technical reasons.

SUMMARY OF THE INVENTION

The object of the present invention is to provide a method for manufacturing alumina whiskers in a higher yield than those of the conventional methods.

According to the present invention, alumina whiskers are manufactured by passing a hydrogen gas containing water vapor and aluminum chloride vapor over aluminum or aluminum alloys such as Zr-Al alloy heated to 1400 to 1600° C. and conducting reaction of said aluminum vapor emitted from said aluminum or its alloys with water vapor in the presence of aluminum chloride vapor.

That is, the present invention is directed to a method for manufacturing alumina whiskers, which comprises passing a hydrogen gas containing water vapor over aluminum or aluminum alloys heated to 1400 to 1600° C. and conducting reaction of aluminum vapor with water vapor, wherein an improvement comprises conducting the reaction in the presence of added aluminum chloride vapor.

In the present invention, partial pressure of said water vapor to hydrogen is $5\times10^{-4}$ atm. or less. Further, it is desirable that aluminum chloride vapor is added to the hydrogen gas so that the aluminum chloride vapor may have a vapor pressure of about $6\times10^{-6}$ to about $2\times10^{-3}$ atm. in the hydrogen gas mixture.

DESCRIPTION OF THE PREFERRED EMBODIMENT

Figure 1:
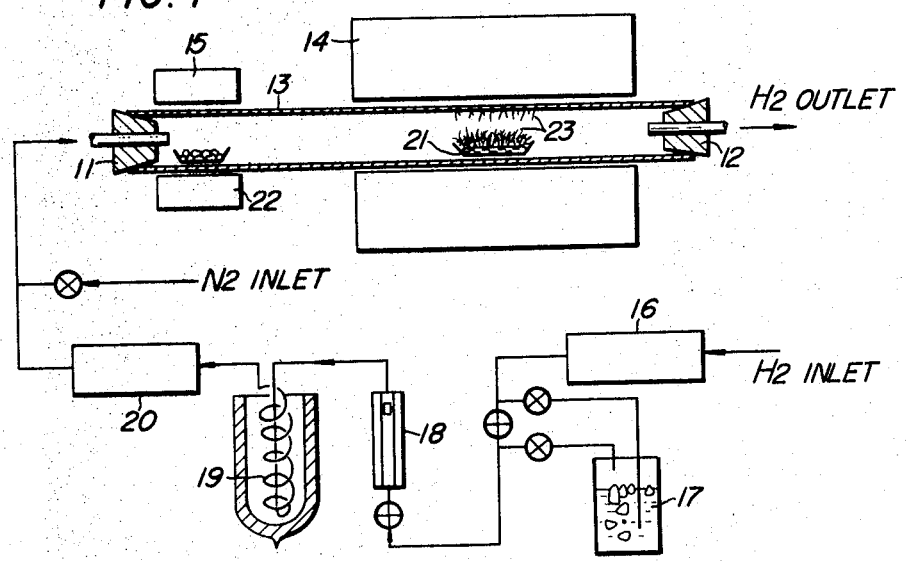
FIG. 1 is a schematic view of an apparatus for manufacturing alumina whiskers, wherein the present method is embodied.

The present invention is explained with reference to the drawings:

In FIG. 1, a schematic view of the apparatus for manufacturing alumina whiskers, wherein the present invention is carried out on a laboratory scale, is illustrated. The apparatus consists of a reaction tube 13, one end of which is a gas inlet 11 and other end of which is a gas outlet 12, an electric furnace 14 for heating aluminum provided toward the gas outlet side of said reaction tube, an electric furnace 15 for heating aluminum chloride provided at a position distant enough from said electric furnace 14 so that it may not be thermally influenced by said electric furnace 14, a hydrogen gas purifier 16, an iced water trap 17 for adding water vapor, a flow controller 18, a cooling trap 19 for controlling a dew point and a dew point meter 20.

Pieces of metallic aluminum or its alloys are placed in an alumina boat 21 and the boat is inserted into the middle portion of the electric furnace 14 for heating aluminum in the reaction tube 13. About 1 g. of aluminum chloride is placed in another boat 22, and the boat is inserted into the middle portion of the electric furnace 15 for heating aluminum chloride. The air in the reaction tube 13 is flushed with nitrogen in the first place, and the nitrogen gas is then replaced with a hydrogen gas. The temperatures of individual electric furnaces are then elevated under the hydrogen atomsphere.

The hydrogen gas purifier 16 is usually called "Deoxo," which comprises a means for converting a small amount of oxygen contained in the hydrogen gas to water vapor through reaction, and molecular sieves. The hydrogen gas leaving the purifier 16 usually contains water vapor of a dew point of $-20$ to $-30°$ C. In order to lower the dew point of the hydrogen gas, liquid nitrogen is used in a cooling trap 19 as a coolant. In order to raise the dew point, on the contrary, an amount of water in the hydrogen gas is increased by bubbling the hydrogen gas leaving the purifier once in the iced water trap 17 or using Dry Ice as a coolant in the cooling trap. The hydrogen gas, whose dew point is thus adjusted to $-30°$ C. or less, is supplied to the reaction tube. When aluminum chloride 22 and aluminum 21 are heated to about 40 to 100° C. and 1400 to 1600° C. by means of the electric furnaces 14 and 15 respectively in said state, aluminum chloride is vaporized little by little and mixed into said hydrogen gas stream, and passes over the heated aluminum or its alloys. When the heating of aluminum 21 is continued in said state, a large amount of needle-like α-alumina single crystal 23 grows on the alumina boat on which said aluminum or its alloys are placed or on the surface of the reaction tube around said boat.

After the reaction is continued for a predetermined period of time in said state, the heating is discontinued and the temperature of aluminum is lowered to less than the melting point. Then the supply of hydrogen gas is discontinued, and the hydrogen gas in the reaction tube 13 is replaced with nitrogen gas. Then, the furnace is left for cooling to the room temperature.

The amount of alumina whiskers thus formed by carrying out the present invention is more than about twice as much as the amount of alumina whiskers obtained by conducting the reaction without adding aluminum chloride to the hydrogen gas.

According to the present inventors' study, the amount of the whiskers obtained by carrying out the present invention in said manner tends to increase when the heating temperature of aluminum is elevated, but when said heating temperature exceeds 1550° C., platelets of single crystal alumina grow together with the needle-like single crystal alumina. Further, when said heating temperature exceeds 1600° C., the proportion of the platelets is rapidly increased, and as a result the needle-like crystals cannot be obtained in a high yield. At the same time, thicker whiskers are formed by increasing the heating temperature.

On the other hand, when the heating temperature of alumina is less than 1400° C., the amount of whiskers formed is much reduced, and the whiskers are formed inefficiently.

The amount of water vapor to be added is controlled to $5 \times 10^{-4}$ atm. or less, as stated above, but when the partial pressure of water vapor is particularly $1 \times 10^{-4}$ atm. or less, a very good result can be obtained.

As regards the amount of aluminum chloride, it is preferable that the vapor pressure of aluminum chloride is in a range of about $6 \times 10^{-6}$ to about $2 \times 10^{-3}$ atm. When the amount of aluminum chloride to be added is larger than said amount, there is a tendency that the needle-like whiskers are hard to grow and further that oxides containing impurities and having colored surfaces are much formed. When the amount of aluminum chloride is less than said amount, there is observed no remarkable difference from the case where no aluminum chloride is added. A particularly preferable range of aluminum chloride is about $1 \times 10^{-5}$ to about $1 \times 10^{-4}$ atm.

Figure 2:
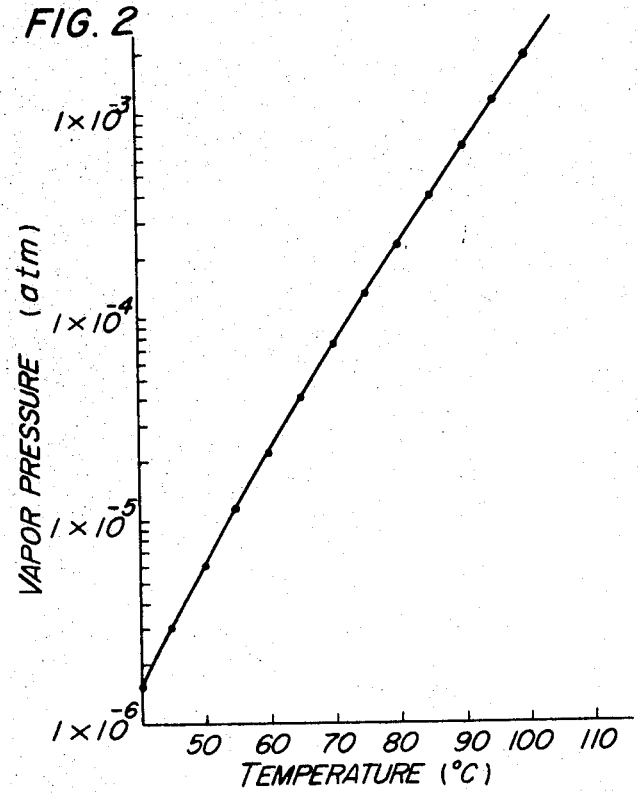
FIG. 2 is a vapor pressure curve of aluminum chloride.

FIG. 2 shows a vapor pressure curve of aluminum chloride. According to the drawing, it is necessary to heat aluminum chloride to at least about 50° C. so that the amount of aluminum chloride may be $6 \times 10^{-6}$ atm. or more by partial pressure. Further, in order to keep the amount of aluminum chloride at $2 \times 10^{-3}$ atm. or less, the heating temperature of aluminum chloride must be kept at about 100° C. or less. However, it must be taken into account that the actual vapor pressure is always a little lower than the ideal equilibrium pressure. In the normal practice, the amount of aluminum chloride to be added is preferably in a range of $1 \times 10^{-5}$ to $1 \times 10^{-4}$ atm. by partial pressure, and the corresponding heating temperature of aluminum chloride is about 60 to about 70° C.

The present invention is hereunder explained in detail with reference to examples.

EXAMPLE 1

A alumina boat having 2 g. of aluminum pieces and a glass boat having 1 g. of anhydrous aluminum chloride are inserted into a reaction tube being made from corrundum (alumina content: 99.7% or higher) and having an inner diameter of 50 mm. and a length of 1000 mm., as shown in FIG. 1, and a hydrogen gas containing water of a dew point of −40° C. (partial pressure: $1 \times 10^{-4}$ atm.) is supplied to the tube at a rate of 500 ml. (NTP)/min. The aluminum and aluminum chloride are heated and kept at 1470° C. and 60° C. for two hours, respectively.

As a result, about 30 mg. of aluminum whiskers having a thickness of 10 to 300μ and a length of 1 to 30 mm. are obtained.

The whiskers thus obtained have a tensile strength of about 1000 kg./mm.² when the thickness of whiskers is several 10μ, and a tensile strength of about 100 kg./mm.² when the thickness is 100μ or more.

The tensile strength of so-called bulk single crystal alumina is generally less than 30 kg./mm.², whereas the tensile strength of alumina based on theoretical calculation corresponds to 4200 kg./cm.².

On the other hand, when the reaction is carried out under the same conditions as above, except the addition of said aluminum chloride according to the conventional method, only about 5 mg. of whiskers are obtained.

EXAMPLE 2

A glass boat having about 1 g. of aluminum chloride and an alumina boat having 2 g. of aluminum granules are inserted into a reaction tube being made from mullite ($3Al_2O_3 \cdot 2SiO_2$) and having an inner diameter of 50 mm. and a length of 1000 mm. in the same manner as in Example 1, and a hydrogen gas containing water vapor of a dew point of −40° C. is passed therethrough at a rate of 400 ml. (NTP)/min., and the aluminum and aluminum chloride are heated and kept to 1470° C. and 70° C., respectively. The heating is continued for about two hours. About 50 mg. of alumina whiskers having a thickness of 0.1 to 300μ and a length of 1 to 20 mm. are obtained.

On the other hand, when the reaction is conducted under the same conditions as above, except the addition of aluminum chloride, about 30 mg. of whiskers are formed.

The difference in the amounts of alumina whiskers formed between said Examples 1 and 2 shows that SiO vapor emitted from the mullite tube effectively influences upon the formation of the whiskers.

EXAMPLE 3

When the heating temperature of aluminum is made higher than 1550° C., the platelet crystals are increasingly formed. The yield of alumina whiskers including the platelet crystals is 40 to 50 mg. However, as shown in the picture, the proportion of thicker needle-like crystals and platelet crystals is much increased, and the amount of alumina whiskers having a practically high strength is relatively decreased.

EXAMPLE 4

When a hydrogen gas having a dew point of −30° C. (corresponding partial pressure of water vapor being about $5 \times 10^{-4}$ atm.) is passed through the reaction tube under the same conditions as in Example 2, only a small amount of alumina whiskers is formed.

As explained above, the alumina whiskers can be produced in the present invention in a yield about twice as high as that obtained by passing a hydrogen gas containing only a very small amount of water vapor over the heated aluminum according to the conventional method, and thus the present invention is of a great industrial value.

We claim:
1. A method for manufacturing alumina whiskers which comprises passing a hydrogen gas containing water vapor and aluminum chloride vapor over a member selected from the group consisting of aluminum and aluminum alloys heated at 1400 to 1600° C. and conducting the reaction of the aluminum vapor thus formed with the water vapor, in the presence of said aluminum chloride vapor.

2. A method according to claim 1, wherein the hydrogen gas contains water vapor having a partial pressure of not more than $5 \times 10^{-4}$ atm. based on one atmosphere of hydrogen.

3. A method according to claim 1, wherein the hydrogen gas contains aluminum chloride vapor having a partial pressure of $6 \times 10^{-6}$ to $2 \times 10^{-3}$ atm. based on one atmosphere of hydrogen.

4. A method for manufacturing alumina whiskers which comprises passing a reactive gas of hydrogen containing water vapor and aluminum chloride over a member selected from the group consisting of aluminum and aluminum alloys at a temperature of between 1400 and 1600° C. to obtain an aluminum vapor and reacting said aluminum vapor with the water vapor in the presence of said aluminum chloride vapor, the water vapor having a partial pressure of not more than $5\times10^{-4}$ atmospheres with respect to one atmosphere of hydrogen and the aluminum chloride vapor having a vapor pressure between $6\times10^{-6}$ and $2\times10^{-3}$ atmospheres.

5. The method of claim 4, wherein the water vapor contained in the hydrogen amounts to not more than $1\times10^{-4}$ atmospheres with respect to 1 atmosphere of the hydrogen.

6. The method of claim 5, wherein the aluminum chloride vapor contained in the hydrogen has a vapor pressure between about $1\times10^{-5}$ and $1\times10^{-4}$ atmospheres.

References Cited
UNITED STATES PATENTS

| | | | |
|---|---|---|---|
| 3,077,380 | 2/1963 | Wainer et al. | 23—142 |
| 3,094,385 | 6/1963 | Brisin et al. | 23—142 |
| 3,130,008 | 3/1964 | Stokes et al. | 23—142X |
| 3,418,076 | 12/1968 | Campell | 23—142 |
| 3,421,851 | 1/1969 | Shyne et al. | 23—142 |

OSCAR R. VERTIZ, Primary Examiner

G. O. PETERS, Assistant Examiner